F. C. SHELTON.
VALVE MECHANISM.
APPLICATION FILED NOV. 10, 1914.
1,175,479.
Patented Mar. 14, 1916.
7 SHEETS—SHEET 4.
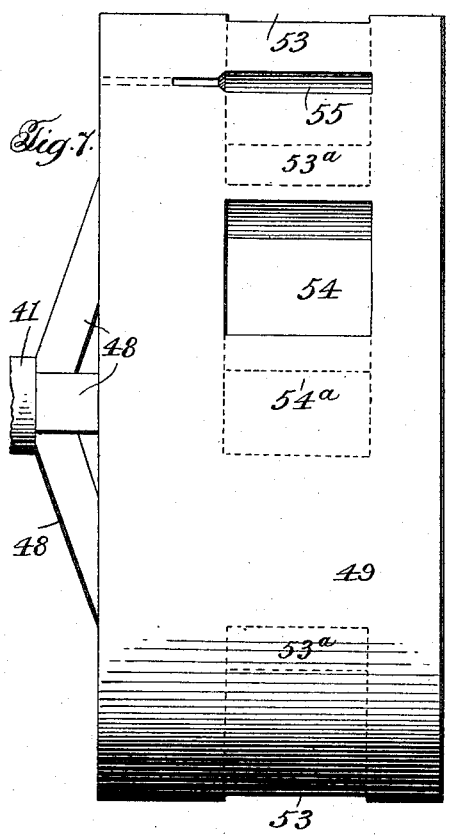
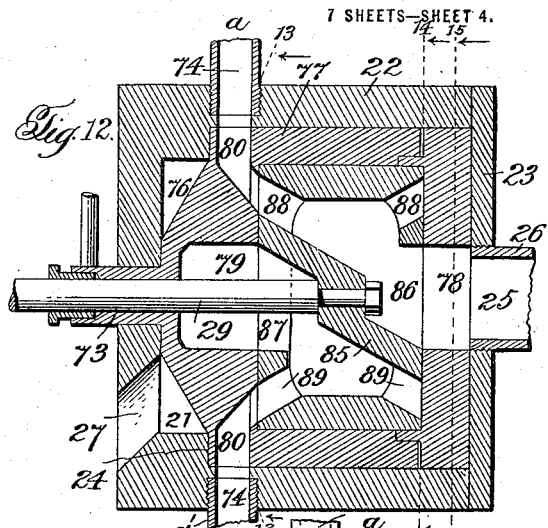
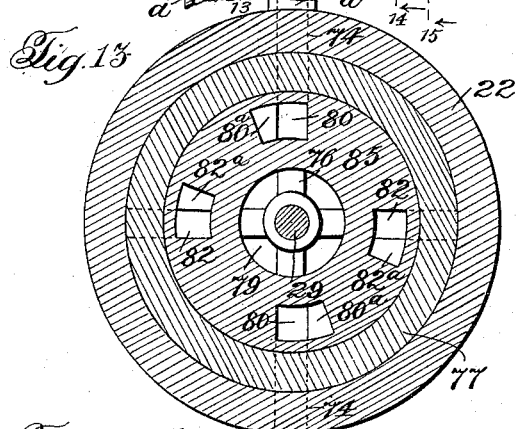
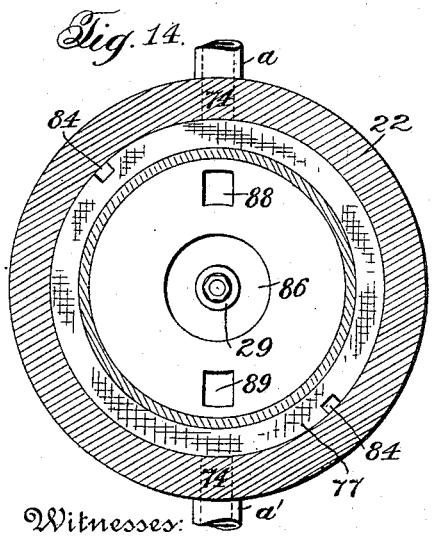
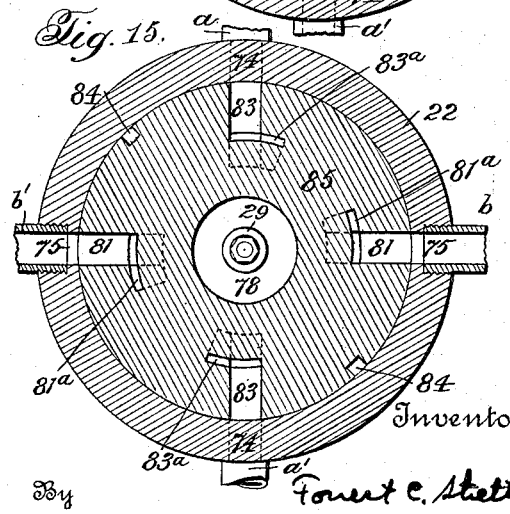
Witnesses:
Jas. Es. Hutchinson.
Gordon E. MacNeil.
Inventor:
Forest C. Shelton,
By Royal E. Burnham, Attorneys.
THE COLUMBIA PLANOGRAPH CO., WASHINGTON, D. C.

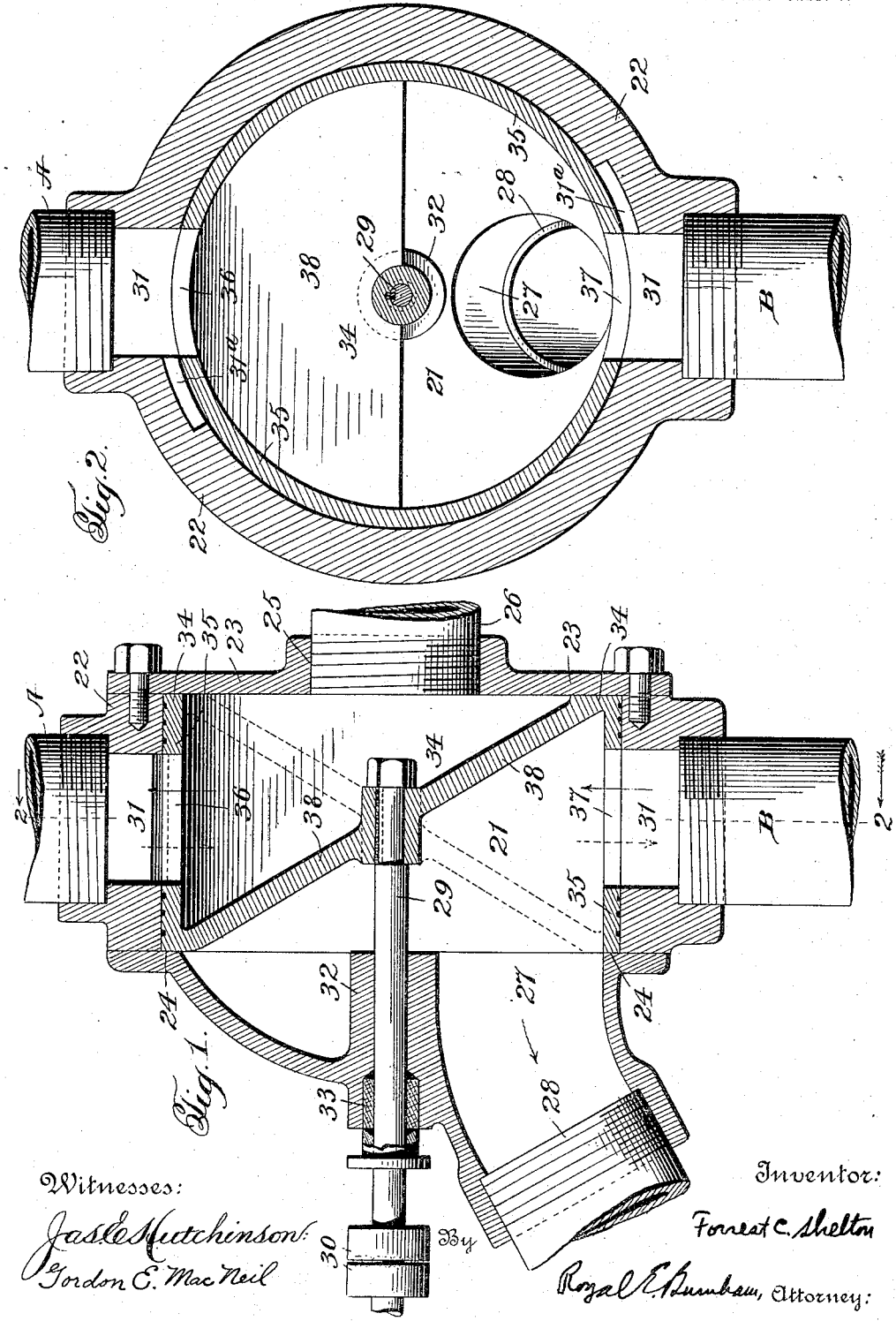

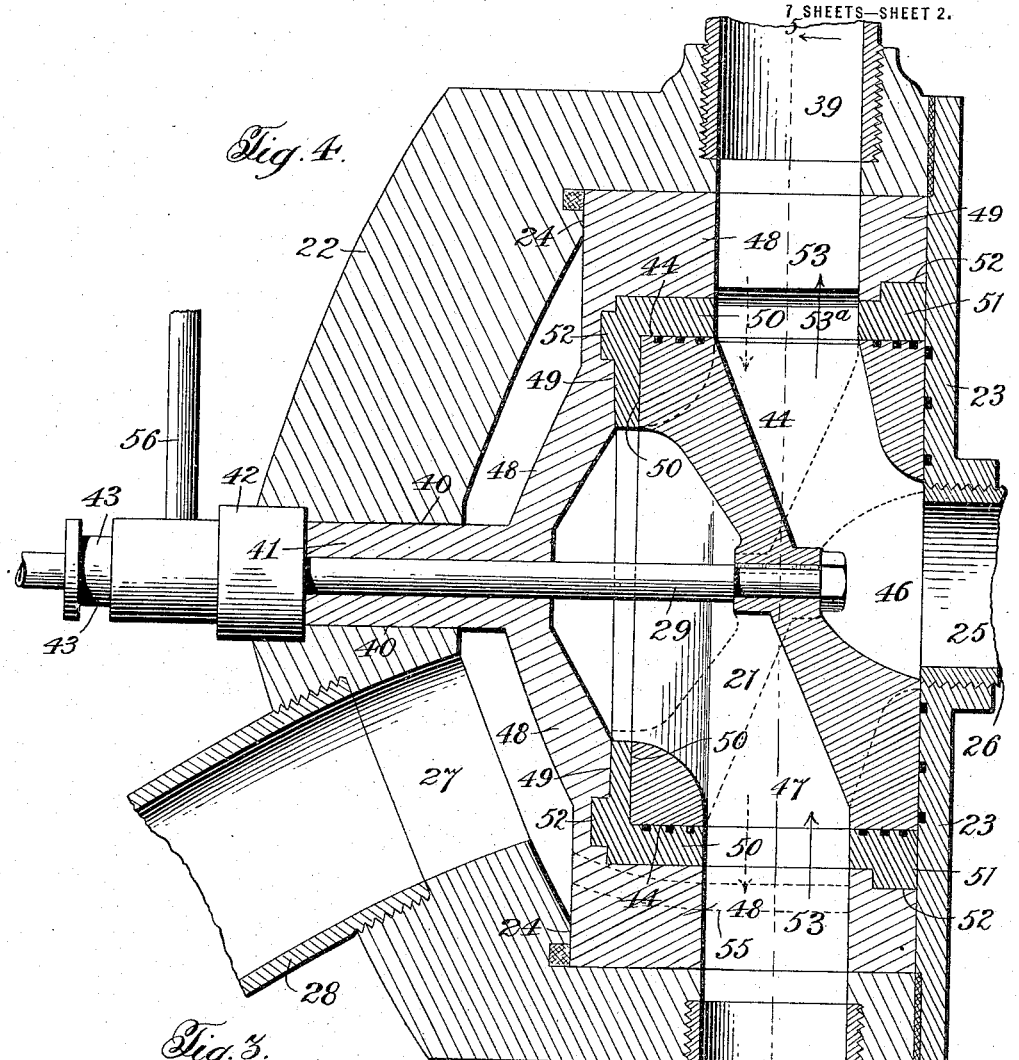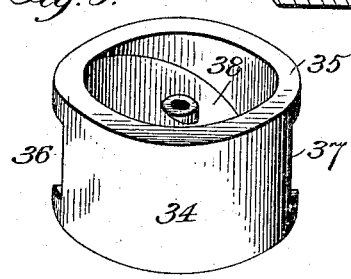

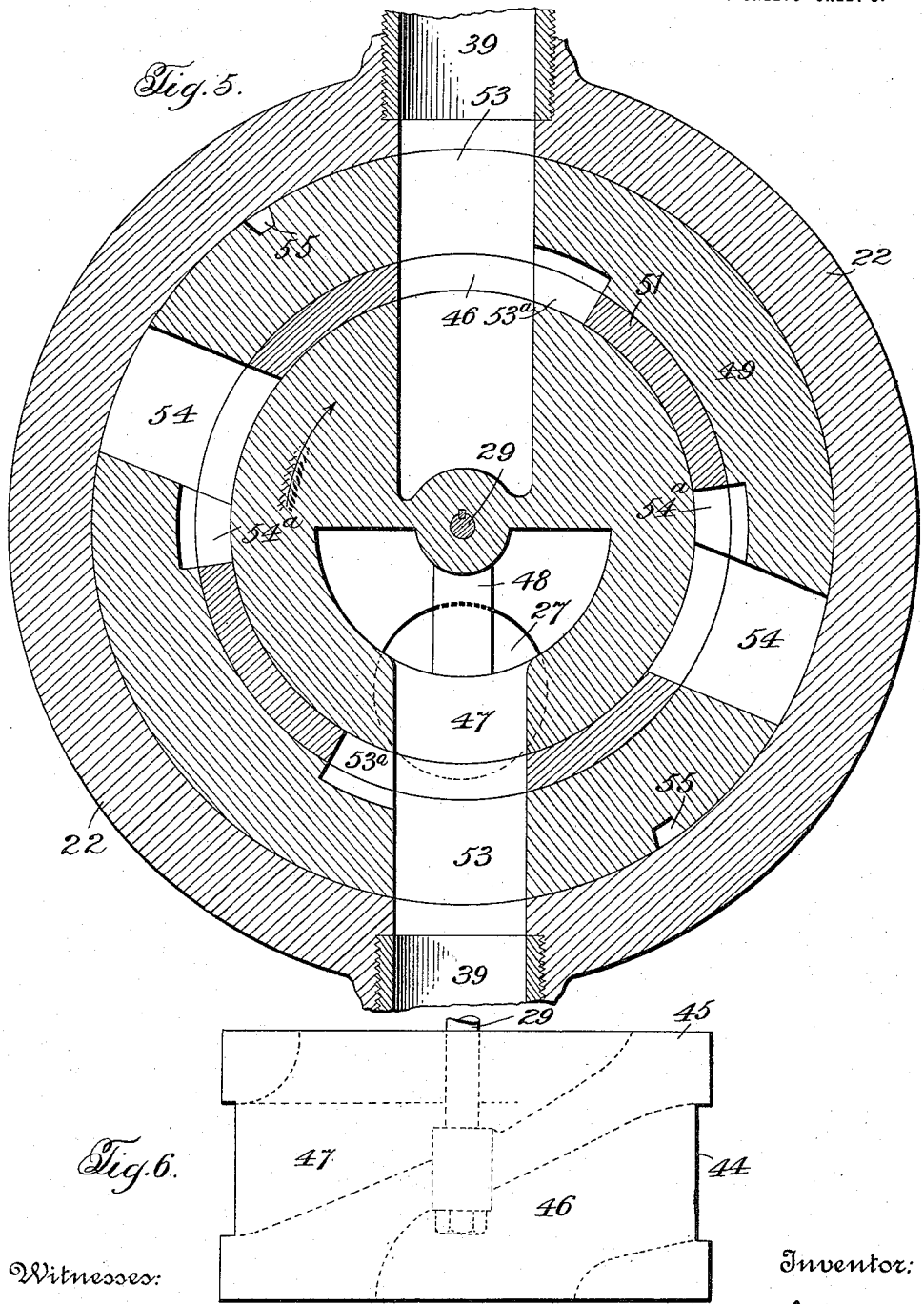

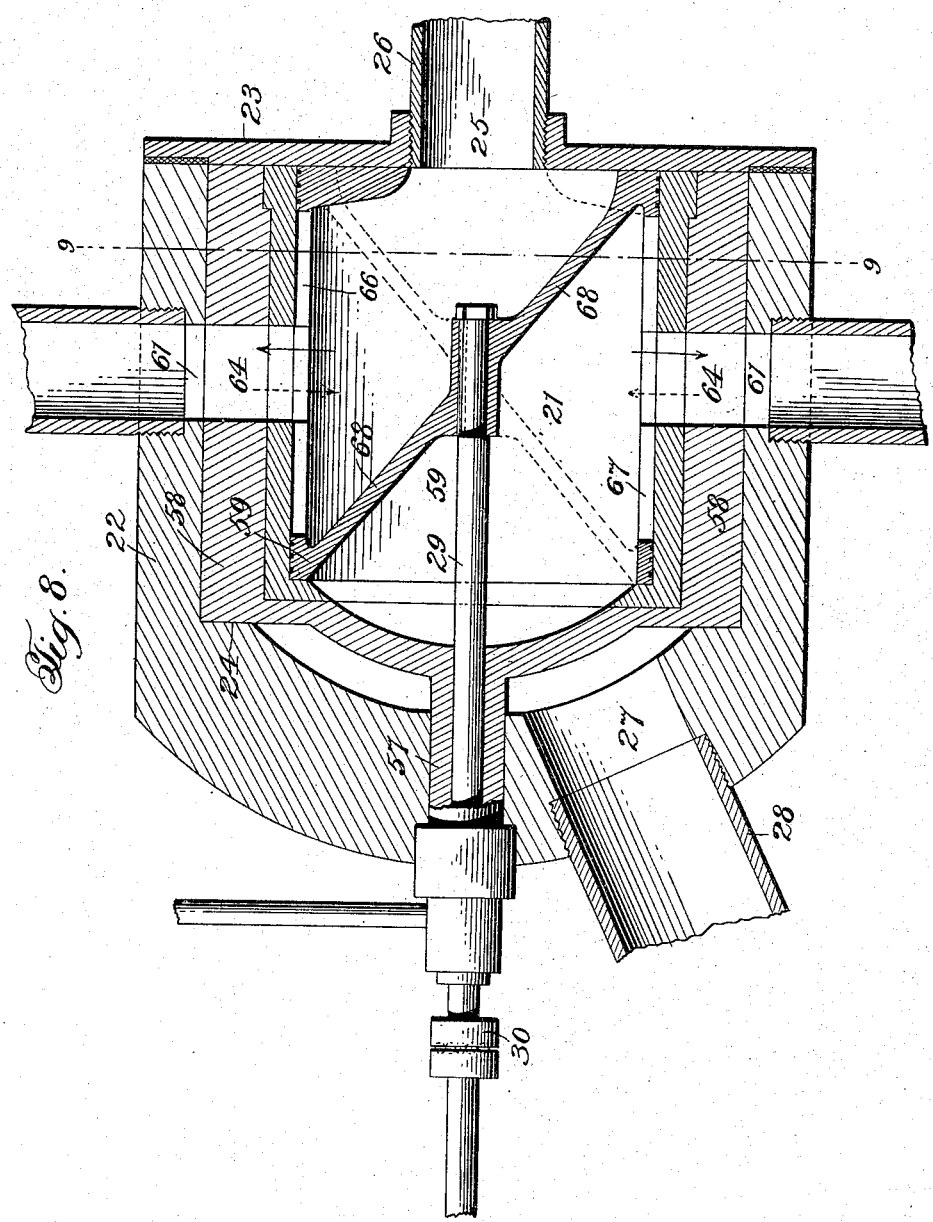

F. C. SHELTON.
VALVE MECHANISM.
APPLICATION FILED NOV. 10, 1914.
1,175,479.
Patented Mar. 14, 1916.
7 SHEETS—SHEET 6.
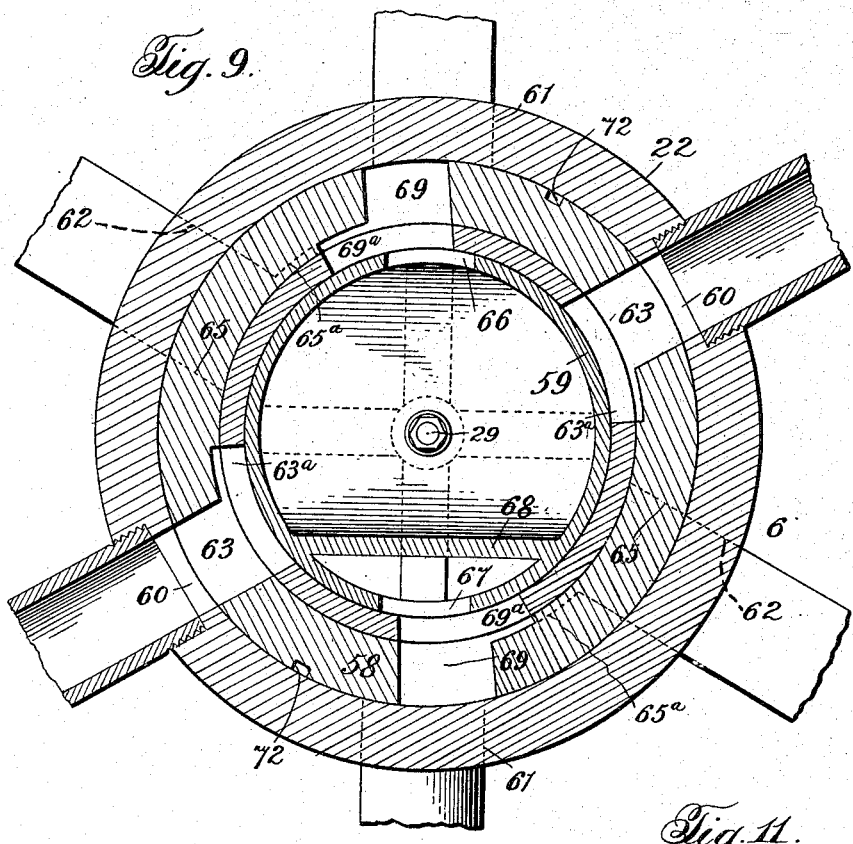
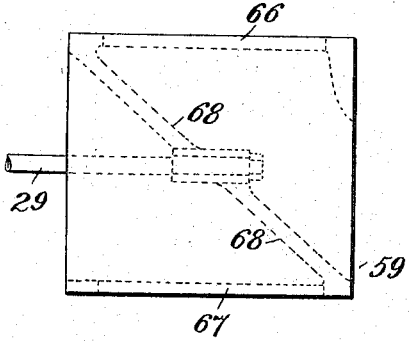
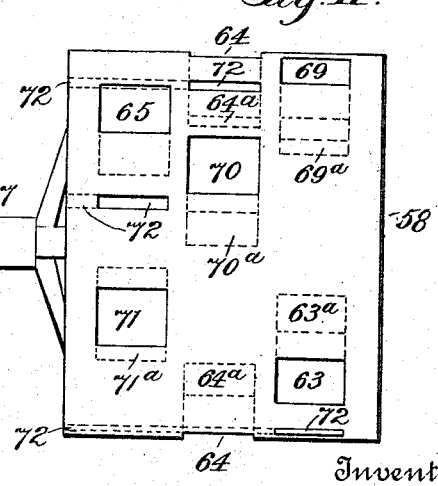
Witnesses:
Jas E Hutchinson
Gordon E. MacNeil
Inventor:
Forest C. Shelton,
By Ryal E Burnham, Attorneys F. C. SHELTON.
VALVE MECHANISM.
APPLICATION FILED NOV. 10, 1914.
1,175,479.
Patented Mar. 14, 1916.
7 SHEETS—SHEET 7.
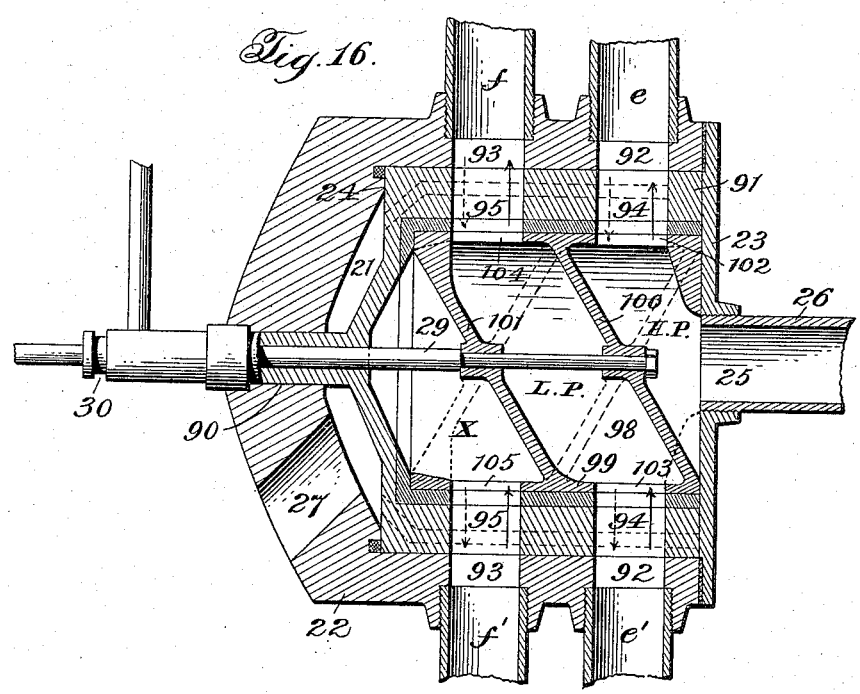
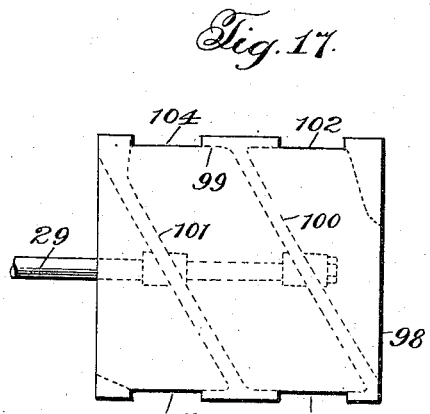
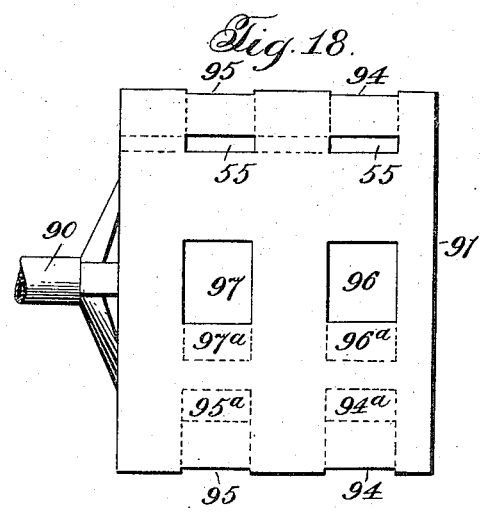
Witnesses:
Jas. E. Hutchinson
Gordon E. MacNeil
Inventor:
By Forest C. Shelton,
Royal E. Burnham, Attorneys

UNITED STATES PATENT OFFICE.

FORREST C. SHELTON, OF WASHINGTON, DISTRICT OF COLUMBIA.

VALVE MECHANISM.

1,175,479.　　　　　　　Specification of Letters Patent.　　　Patented Mar. 14, 1916.

Application filed November 10, 1914.　Serial No. 871,336.

*To all whom it may concern:*

Be it known that I, FORREST C. SHELTON, a citizen of the United States, residing at Washington, in the District of Columbia, have invented certain new and useful Improvements in Valve Mechanism, of which the following is a specification, reference being had therein to the accompanying drawing.

This valve is designed for use with fluid-pressure motors, it is so formed and arranged that it will control both admission and exhaust of fluid, and it particularly is adapted for employment with both single and multiple cylinder reciprocating engines and with reciprocating engines of both single and multiple expansion types.

The invention further contemplates a valve mechanism that can be regulated in response to variance of load or other conditions to admit more or less fluid to an engine, it is adapted to shut off fluid when desired, and it includes means whereby the engine with which it is associated can be reversed.

When read in connection with the description herein, the details of construction and arrangement of parts contemplated by the invention will be apparent from the accompanying drawings, forming part hereof, wherein embodiments of the invention adapted for use with reciprocating steam engines are disclosed, for purposes of illustration.

While the disclosures herein now are considered to represent preferable embodiments of the invention, it is to be understood that they merely are illustrative of the principles thereof, that the several instrumentalities employed in carrying out the invention can be organized variously within the limits of the claims and can be used with other devices than those in association with which the invention is explained without departing from the nature and spirit of the invention, and that it is not the intention to be limited necessarily to the exact delineation herein in interpretation of the claims.

Like reference-characters refer to corresponding parts in the views of the drawings, of which—

Figure 1 is an axial sectional view of a valve mechanism for a one-way single-cylinder engine; Fig. 2 is a sectional view on the line 2—2, Fig. 1; Fig. 3 is a view of a valve of the type shown in Figs. 1 and 2; Fig. 4 is an axial sectional view of a single-cylinder engine valve mechanism having a control-sleeve; Fig. 5 is a sectional view on the line 5—5, Fig. 4; Fig. 6 is a view of a valve of the type shown in Figs. 4 and 5; Fig. 7 is a view of a control-sleeve of the type shown in Figs. 4 and 5; Fig. 8 is an axial sectional view of a valve mechanism for a plurality of cylinders; Fig. 9 is a sectional view on the line 9—9, Fig. 8; Fig. 10 is a view of a valve of the type shown in Figs. 8 and 9; Fig. 11 is a view of a control-sleeve of the type shown in Figs. 8 and 9; Fig. 12 is an axial sectional view of another form of valve mechanism for a plurality of cylinders; Fig. 13 is a sectional view on the line 13—13, Fig. 12; Fig. 14 is a sectional view on the line 14—14, Fig. 12; Fig. 15 is a sectional view on the line 15—15, Fig. 12; Fig. 16 is an axial sectional view of a valve mechanism for a multiple-expansion engine; Fig. 17 is a view of a valve of the type shown in Fig. 16; and Fig. 18 is a view of a control-sleeve of the type shown in Fig. 16.

In all of the figures in which those parts appear, 21 designates a valve-chamber circular in cross-section; 22 a casing comprehending the chamber peripherally and at one end and having a closing-plate 23 at the other end; 24 an annular abutment opposed to said closing-plate; 25 a steam-inlet in one end of the casing and preferably in the axial line of the chamber in the plate 23; 26 a steam-supply conduit in communication with the inlet; 27 an exhaust-outlet leading from the chamber at the end opposite to the steam-inlet; 28 an exhaust-conduit leading from the exhaust-outlet to a condenser and vacuum, to the atmosphere, or to any other desired place; 29 a rotatable valve-shaft extending inwardly and outwardly of the casing in the axial line of the chamber and rotated by any suitable means at the speed required to move a valve thereon yet to be described; and 30 any suitably-supported thrust-bearing to receive thrust imposed on the shaft by fluids whose disposition is determined by the valve and to relieve parts from wear incident to axial thrust. Arrows in full lines indicate direction of flow of fluids when certain parts are in the positions shown by full lines, and arrows in dotted lines indicate direction of flow at some other times.

*I. One-way single-cylinder valve.*—Referring particularly to Figs. 1, 2, and 3, 31 designates passages positioned in the peripheral portions of casing 22, preferably at diametrically-opposite places, the passages leading radially from and into the valve-chamber. The casing 22 has a boxing 32, in which the valve-shaft 29 is journaled, packing 33 being positioned in the boxing and around the shaft to prevent leakage from the valve-chamber.

A valve 34 within the casing 22 is fixed on and rotated by shaft 29. This valve comprises a cylindrical hollow member in the form of an annular flange or ring 35, which has substantially fluid-tight contact with the peripheral inner surface of the casing and is rotatable with respect to that surface and between and in substantially fluid-tight contact with the closing-plate 23 and the abutment 24. At places in ring corresponding to the relative positions of the passages 31, and at diametrically opposite places when those passages are so located, there are an outlet-port 36 and an exhaust-port 37, which are capable of simultaneous registry with the passages 31 and of thereby periodically permitting communication between the interior and exterior of the valve-chamber. In order to prolong the periods during which steam is permitted to flow through the casing-passages, those passages may be enlarged by having extensions 31ª extending circumferentially therefrom and opening to the inner periphery of the casing where the valve-ports in their revolution may register with them. A diaphragm or partition 38 is centrally and fixedly secured to the valve-shaft at an inclination thereto, at its periphery it is joined to, or integrally formed with, the ring, and its inclination is such that outlet-port 36 is on the same side of it as the steam-inlet port 25 and the exhaust-port 37 is on the opposite side or on the same side as the exhaust-outlet 27. The diaphragm thus divides the valve-chamber into a supply compartment and an exhaust-compartment, it prevents direct communication between ports 36 and 37, and it provides in the valve a passage from the steam-inlet to the passages 22 and a passage from passages 22 to the exhaust.

When the parts are in the positions shown by full lines, to which they periodically come during rotation of the valve, the ports 36 and 37 are in registry with the passages 31, steam is flowing from inlet 25 into the chamber at one side of the diaphragm and out through port 36 and through a pipe A into an engine-cylinder at one side of its piston, and exhaust is flowing from the other side of the piston through a pipe B and port 37 into the chamber at the other side of the diaphragm and out through the exhaust-outlet 27. During continuous rotation of the valve, it also periodically comes to the position shown by dotted lines, when the port 36 will register with the passage 31 through which exhaust previously has passed, port 37 will register with the passage 31 through which steam previously has passed to the engine, and flow of steam will be through pipe B to the engine and through pipe A from the engine. Thus in this manner flows of steam to and from an engine will be permitted successively.

*II. Single-cylinder reverse, control, and stop valve.*—Figs. 4, 5, 6, and 7 illustrate a valve mechanism that can be operated to cause an engine with which it is associated to reverse and stop and that is responsive to regulation to supply the variable amount of steam required to meet varying loads on the engine.

The casing 22 has passages 39, similar to the casing-passages of the one-way form, positioned preferably at diametrically-opposite places. There is a boxing 40 in the exhaust side of the casing, somewhat larger than that of Fig. 1, in which is journaled a hollow shaft 41, having packing 42 therearound in the boxing to prevent leakage from the valve-chamber. The valve-shaft 29 in this form is journaled in the shaft 41, packing 43 being positioned in the shaft 41 and around the valve-shaft to prevent leakage.

The valve-shaft has thereon within the valve-chamber a valve 44, which may be like that of Figs. 1, 2, and 3, but which, in order to disclose another form contemplated by the invention, is shown to be a disk 45, having a steam-inlet port or passage 46 leading from the center of one side to the periphery and a steam-exhaust port or passage 47 leading from an opposite place in the periphery to the center of the other side. As in the case of valve 34, the valve 44 separates the receiving portion of the chamber from the exhaust portion. The passage 46 is arranged to take steam at the side of the disk from the steam-inlet 25 and to discharge it at the periphery, and the passage 47 is arranged to take steam at its peripheral end and to discharge it at the other side of the disk into the portion of the chamber in communication with the exhaust-outlet 27.

The shaft 41 has extending radially therefrom within the valve-chamber arms 48, which are connected to or integrally formed with, an annular reverse and throttle control-sleeve 49. This controller is interposed between the peripheral inner surface of the casing 22 and the peripheral outer surface of valve 44, and it has movable fluid-tight contact with those surfaces. The valve 44 is rotatable between the closing-plate 23 and an annular abutment 50 in the sleeve and in substantially fluid-tight contact with those parts, and the sleeve in turn has substantially fluid-tight contact with the closing-plate and the abutment 24 of the casing. If desired, the sleeve may have a bushing 51 extending around its interior periphery and abutment and on which the valve runs, the bushing having lugs 52 extending into parts of the sleeve to prevent relative rotative movement with respect to the sleeve. When worn, the bushing may be withdrawn and another substituted. A similar bushing may be associated in like manner with the casings or sleeves of the other forms herein disclosed to take up wear resulting from rotation of the valve.

The controller has therein radially-disposed passages or ports 53, for distinguishment called main ports, which are so positioned as to be capable of simultaneous registry with the ends of the passages 39 in the casing 22, and during rotation of the valve 44 the peripheral ends of the passages 46 and 47 thereof will register with ports 53, whereby, when the latter ports are in registry with the passages 39, as they are when the engine is running in its normal direction, steam is permitted to flow to and from an engine-cylinder in a manner similar to that described with respect to the form of Figs. 1, 2, and 3.

In order to prolong the periods during which steam is supplied and exhausted through ports 53 to and from an engine, each of those ports has an offset 53$^a$ extending circumferentially therefrom in the direction of rotation of the valve and opening to the space occupied by the valve.

For the purpose of reversing the direction of operation of the engine, for each port 53 there is formed through the sleeve from periphery to periphery a supplementary port 54 in such position that the valve-ports will register therewith during rotation of the valve before reaching the adjacent port 53; and the supplementary passage has an offset 54$^a$, similar to offset 53$^a$, and extending from the supplementary port in a direction opposite to that of normal rotation of the valve.

Between each pair of ports 53 and 54 there is a neutral channel 55, which opens to the outer periphery of the sleeve where it is capable of registry with passages 39 and whence it leads to the exhaust side of the valve-chamber.

Outside of the casing 22, the shaft 40 has thereon a lever 56 or any other suitable means by which the shaft and the sleeve thereon may be rocked, and this control means may be associated with an engine-governor in such manner that the shaft may be turned by, or independently of, the governor.

The operation of the sleeve is as follows: When the sleeve is turned in the direction of the arrow of Fig. 5, either manually or under the influence of a governor or otherwise, the passages 39 are partly closed and flow of steam through those passages regulated in an obvious manner. When it is desired to stop the flow of steam, the sleeve is turned farther in the same direction to bring the ports thereof out of registry with and to close the passages 39 and until the neutral channels 55 are brought into registry with the passages, and then the sleeve prevents communication between the valve-chamber and those passages. The neutral channels then afford communication between the casing-passages and the exhaust portion of the valve-chamber and permit the engine to be drained. When it is desired to reverse the engine, the sleeve is turned farther in the same direction and until ports 54 come into registry with the passages 39 of the casing. Then, as the offsets 54$^a$ extend ahead of the ports 54, the valve-passages reach the offsets at times prior to the times they reach the ports 53 when those ports are in registry with the casing-passages. Therefore, pressure steam flows through one port 54 to the engine-piston before the piston has reached a limit of reciprocation and the piston thereby is caused to move in the opposite direction, and exhaust steam is permitted to flow through the other port 54.

The neutral channel of each set of ports 53 and 54 is placed midway between those ports, and the ports are placed a sufficient distance apart to permit the sleeve entirely to close the passages 39 before the neutral channels come into registry therewith, in order to prevent pressure steam from flowing through the neutral channels as would be the case if the channels opened to the passages 39 before they are closed from communication with the valve-chamber.

It will be seen that, while the valve 44 is described and shown as used with a controller, it also is adapted for use in place of valve 34 of the embodiment for a one-way single-cylinder engine.

*III. Multiple-cylinder reverse, control, and stop valves.*—There is shown by Figs. 8, 9, 10, and 11 an adaptation of valve mechanism for controlling flow of motive fluid to and from a plurality of engine-cylinders. In this form of mechanism, the casing 22 and its inlet 25 and outlet 27, the valve-shaft 29, a governor and reverse shaft 57, a sleeve 58, and certain associated parts are similar to corresponding parts in Fig. 4, and a valve 59 is similar to that of Fig. 1. However, there are these exceptions, that the casing, sleeve, and valve are sufficiently elongated to accommodate a plurality of casing-passages 60, 61 and 62 and correspondingly-arranged sleeve-ports 63, 64, and 65 disposed in three annular lines and the passages and ports of each pair being oppositely disposed, and an elongated outlet-port 66 and an elongated exhaust-port 67 in the valve sufficiently long to be capable of registry with the three lines of sleeve-ports at different times. The valve-ports are separated by a diaphragm 68, as in the case of the valve of Fig. 1. In order to prolong the periods during which steam is supplied and exhausted through the sleeve-ports, each of those ports has an offset extending circumferentially therefrom in the direction of rotation of the valve and opening to the space occupied by the valve, these offsets being designated by 63ª, 64ª, and 65ª.

In the embodiment shown by Figs. 8, 9, 10, and 11, the sleeve-ports and casing-passages are arranged successively in annular disposition at different places in the peripheries of the parts in such manner that the valve-ports during rotation of the valve will reach one pair of sleeve-ports and supply steam to, and permit exhaust from, one cylinder and then close those ports, and successively in like manner will act in coöperation with the other sleeve-ports, so that steam is flowing from the valve-chamber momentarily into only one cylinder at a time. This form of valve mechanism also includes means whereby the direction of operation of an engine or engines controlled thereby may be reversed in a manner similar to that of the form shown by Figs. 4, 5, 6, and 7. That is to say, for every sleeve-port 63, 64, and 65, there is, respectively, a supplementary port 69, 70, and 71 extending through the sleeve in such position that the valve-ports will register therewith during revolution before reaching the following main ports in the sleeve; and every supplementary port has an offset 69ª, 70ª, or 71ª, as the case may be, similar to and for the same purpose as the offsets 54ª, and extending in a direction opposite to that of rotation of the valve.

Between every pair of sleeve-ports 63—69, 64—70, and 65—71, a neutral channel 72 opens to the outer periphery of the sleeve, where it is capable of registry with the casing-passages, and whence it leads through the sleeve to the exhaust side of the valve-chamber. The operation of the sleeve of this form, and the function of the ports and passages thereof, are practically the same as in the form of Figs. 4, 5, 6, and 7. The length and capacity of the offsets of both forms may be made in accordance with the demands of the engine with which the valve mechanism is to be used.

As shown by Figs. 12, 13, 14, and 15, the casing 22 has its inlet 25 centrally located at one end, and its outlet at the other end, and the valve-shaft 29 and a governor and reverse shaft 73 are positioned similarly to the other forms. In the form disclosed by these last-named figures, a plurality of pairs of passages opening to the valve-chamber are disposed radially in the casing and are in communication with the same number of engine-cylinders. In the embodiment shown, there are two pairs of casing-passages 74 and 75, one pair near each end of the casing, in communication with two engine-cylinders by means of two pairs of pipes *a—a'* and *b—b'*, the pairs of passages and pipes at each end being equally spaced, those of each pair being oppositely disposed, and the two pairs being placed in diametrical lines substantially at right angles to each other. In the exhaust-portion of the casing, arms 76 extend radially from the shaft 73 and are connected to a hollow cylindrical governor member or "sleeve" 77, constituting a controller, which is closed at its ends, except for an inlet 78 in the receiving end and an outlet 79 in the exhaust end. The inlet and outlet are coaxial with the inlet 25, and the latter opens to the inlet of the sleeve. The member 77 has formed therein two pairs of passages 80 and 81, opening to its periphery, disposed correspondingly to and arranged normally to register at their peripheral ends with the casing-passages. The sleeve-passages in their outer portions are disposed radially and in their inner portions at an inclination to the radial, in such manner that their inner ends open to the interior of the sleeve at its ends. In order to prolong the periods during which steam is supplied and exhausted through the sleeve-passages, each of those passages has an offset extending circumferentially therefrom in the direction of rotation of a valve yet to be described and in the inner end face of the sleeve and opening to the interior of the sleeve, these offsets being designated by 80ª and 81ª. For the purpose of reversing the direction of operation of parts controlled by the valve arrangement now being described, for each passage 80 and 81 there are formed in the sleeve similar supplementary passages 82 and 83, which normally are out of registry with the casing-passages 74 and 75, and they are placed in such position that valve-ports will register therewith during rotation of the valve before reaching the following passages 80 and 81. Every supplementary passage has an offset 82ª and 83ª, similar to the offsets 80ª and 81ª, extending in a direction opposite to that of rotation of the valve. Between each pair of passages 80—82 and 81—83, the end of a neutral channel 84 opens to the periphery of the sleeve, where it is capable of registry with the casing-passages, and whence it leads through the sleeve to the exhaust side of the valve-chamber. The valve-shaft 29 has thereon within the sleeve a valve 85, which is substantially the shape of a circular disk, is rotatable in substantially fluid-tight contact with the inner peripheral and end faces of the sleeve, and divides the chamber into fluid supply and exhaust compartments. The valve has opening from its end faces an inlet 86 and an outlet 87, which respectively, at their outer ends, are the same size as and register with the inlet 78 and outlet 79 of the sleeve. In order to afford communication between the passages 86 and 87 of the valve and the passages of the sleeve, two supply-ports 88, one on each end of the valve, open to the inlet-passage 86, and two exhaust-ports 89, one on each end of the valve, open to the outlet-passage 87. The ports 88 and 89 are formed in the ends of the valve at an inclination to its axis, and at their outer ends they open to the end faces of the valve, where they are substantially the same size as, and are arranged to register with, the sleeve-passages.

When this form of valve mechanism is in use, pressure fluid enters the valve passage 86 through the sleeve-inlet 78 and is directed to the parts to be moved thereby through the supply-ports 88 and sleeve-passages, and spent fluid is permitted to discharge through sleeve-passages and the exhaust-ports 89. For example, assuming the parts to be in the positions shown by Fig. 12, steam is flowing from one of ports 88 through pipe $a$ into an engine-cylinder at one side of its piston therein, and exhaust steam is flowing from the other side of the piston through pipe $a'$ and out through one of ports 89, and thereafter, during rotation of the valve, its other ports will register with other sleeve-passages in communication with pipes $b$ and $b'$ and supply steam to and permit it to exhaust from the cylinder with which they are in communication. The sleeve is operated to control supply of steam by rocking on its shaft in a manner similar to that of previously-described forms.

IV. *Multiple-expansion valve.*—This invention further contemplates a valve mechanism adapted to control flow of motive fluid to and from a multiple-expansion engine, and a form of such a mechanism suitable for use with a two-expansion engine is shown by Figs. 16, 17, and 18, for illustrative purposes. In these figures, the casing 22 and its inlet 25 and outlet 27, the valve-shaft 29, a governor and reverse shaft 90, a sleeve 91, and certain associated parts are comparatively elongated as in the form shown by Fig. 8, in order to accommodate pairs of casing-passages 92 and 93, the passages of each pair being oppositely disposed and extending radially with respect to the chamber within the casing, and the passages of the different pairs on each side of the casing being disposed in lines parallel to the axis thereof. The sleeve 91 is formed with pairs of similarly-arranged main ports 94 and 95, normally in registry with the casing-passages, and having at their inner ends offsets 94ª and 95ª, to prolong the periods of passing steam as in other forms. For the purpose of reversing the direction of operation of the engine, for each port 94 and 95 there is in the sleeve, respectively, a supplementary port 96 or 97, so positioned that the ports of the valve yet to be described will register therewith during rotation of the valve before reaching the following port 94 or 95, and each supplementary port has an offset 96ª or 97ª extending therefrom in a direction opposite to that of normal rotation of the valve. Between each pair of ports 94—96 and 95—97 there is a neutral channel 55, which opens to the outer periphery of the sleeve where it is capable of registry with casing-passages and whence it leads to the exhaust side of the valve-chamber. The operation of the sleeve of this form, and the function of the ports and passages thereof, are practically the same as those of previous forms.

The valve-shaft has thereon within the sleeve a valve 98. This valve comprises an annular ring, flange, or hollow cylinder 99, which has substantially fluid-tight contact with the inner peripheral surface of the sleeve and is rotatable with respect to that surface and between and in substantially fluid-tight contact with the closing-plate of the casing and the abutment of the sleeve. Diaphragms 100 and 101, disposed in substantially parallel relation to each other, are centrally and fixedly secured to the valve-shaft at an inclination thereto, and at their peripheries they are joined to, or integrally formed with, the part 99. The inclination of the diaphragms is such that one of them, 100, extends from an annular line between the closing-plate or receiving side of the casing and the passages 94 at one side of the part 99 to an annular line between the two pairs of passages 94 and 95 at the other side of part 99; and the other diaphragm, 101, extends from a place at one side of part 99 between the two pairs of ports 94 and 95 to a place between a port 95 and the sleeve-abutment at the other side of part 99. The arrangement of the diaphragms is such that there is provided within the valve a high-pressure compartment HP into which the steam inlet 25 leads, a lower-pressure compartment LP between the two diaphragms (which also may be termed an exhaust-compartment, as it receives exhaust fluid), and an exhaust-compartment X between the diaphragm 101 and the end of the casing opposite to the closing-plate and from which compartment the outlet 27 leads. In the annular part 99 of the valve there are a port 102 communicating with the high-pressure compartment and a port 103 communicating with the lower-pressure compartment and both being so positioned as to be capable of simultaneous registry with the sleeve-ports 94, and a port 104 communicating with the lower-pressure compartment and a port 105 communicating with the exhaust compartment and both being so positioned as to be capable of simultaneous registry with the sleeve-ports 95. The ports and compartments of the valve constitute in the valve high-pressure, lower-pressure, and exhaust passages capable of periodically affording communication between the inlet 25 and one of the high-pressure passages 94 of the sleeve, between the other port 94 and the opposite port 95 of the sleeve, and between the other port 95 of the sleeve and the exhaust portion of the casing.

When, for example, the parts are in the positions shown by full lines in Fig. 16, steam is entering the high-pressure valve-passage through inlet 25 and is flowing through port 102, a sleeve-port 94, a casing-passage 92, and a pipe *e* to an engine-cylinder at one side of its piston, steam is flowing from the other side of the piston of that cylinder through a pipe *e'*, the other casing-passage 92, the other sleeve-passage 94, and the valve-port 103 into the lower-pressure valve-passage; and from the lower-pressure passage the steam flows through the valve-port 104, a sleeve-passage 95, a casing-passage 93, and a pipe *f* to another engine-cylinder at one side of its piston, and steam is flowing from the other side of that piston through a pipe *f'*, the other casing-passage 93, the other sleeve-port 95, and the valve-port 105 to the exhaust passage of the valve, whence it is disposed of through the outlet 27. During rotation of the valve, its ports periodically will come to the positions and the results will be the same as those just described; and the parts and ports also periodically will come to the positions shown by dotted lines, when steam will flow through pipe *e'* to the side of the piston from which steam just has been exhausted, steam will be exhausted from the other side of the piston through pipe *e* and diverted through the lower-pressure passage and pipe *f'* to the side of the piston of the other cylinder from which steam just has been exhausted, and steam will be exhausted through pipe *f* from the other side of that piston.

Having thus described my invention, what I claim as new, and desire to secure by Letters Patent, is—

1. A valve mechanism comprising a casing comprehending an annular chamber and having passages and a fluid-supply inlet and a fluid-exhaust outlet opening to the chamber, in said chamber a rockable annular controller, and in said controller a rotary valve separating said inlet and outlet, said controller having main ports normally in registry with said casing-passages and for one of the main ports a supplementary port capable of registry with said casing-passages and having at its inner end an offsetted opening extending oppositely to the normal direction of rotation of the valve, and said valve having passages capable of simultaneous registry with controller-ports and one of them of affording communication periodically between said inlet and a port and another of them of affording communication periodically between a port and said outlet.

2. A valve mechanism comprising a casing comprehending a chamber and having passages and a fluid-supply inlet and a fluid-exhaust outlet opening to the chamber, in said chamber a rockable controller having ports normally in registry with casing-passages and having a neutral channel capable of registry with a casing-passage and communicating with said outlet, and in said controller a rotary valve separating said inlet and outlet and arranged simultaneously to afford communication between said inlet and a controller-port and between another controller-port and said outlet.

3. A valve mechanism comprising a casing comprehending an annular chamber and having passages and a fluid-supply inlet and a fluid-exhaust outlet opening to the chamber, in said chamber a rockable annular controller, and in said controller a rotary valve separating said inlet and outlet, said controller having main ports normally in registry with casing-passages and for each main port a supplementary port capable of registry with casing-passages and having at its inner end an offsetted opening extending oppositely to the normal direction of rotation of said valve and between each pair of main and supplementary ports a neutral channel capable of registry with a casing-passage and communicating with said outlet, and said valve having passages capable of simultaneous registry with controller ports and one of them of affording communication periodically between said inlet and a port and another of them of affording communication periodically between another port and said outlet.

4. A valve mechanism comprising a casing comprehending an annular chamber and having passages and a fluid-supply inlet and a fluid-exhaust outlet opening to the chamber, in said chamber a rockable annular controller, and in said controller a rotary valve, said controller having main ports normally in registry with casing-passages and for one of the main ports a supplementary port capable of registry with a casing-passage and having at its inner end an offsetted opening extending oppositely to the normal direction of rotation of the valve, and said valve having a passage capable of affording communication periodically between said inlet and controller-ports and having another passage capable of affording communication periodically between controller-ports and said outlet.

5. A valve mechanism comprising a casing comprehending a chamber and having passages and a fluid-supply inlet and a fluid-exhaust outlet opening to the chamber, in said chamber a rockable controller having ports normally in registry with casing-passages and having a neutral channel capable of registry with a casing-passage and communicating with said outlet, and in said controller a rotary valve having a passage capable of affording communication periodically between said inlet and controller-ports and having another passage capable of affording communication periodically between controller-ports and said outlet.

6. A valve mechanism comprising a casing comprehending an annular chamber and having passages and a fluid-supply inlet and a fluid-exhaust outlet opening to the chamber, in said chamber a rockable annular controller, and in said controller a rotary valve, said controller having main ports normally in registry with casing-passages and for each main port a supplementary port capable of registry with casing-passages and having at its inner end an offsetted opening extending oppositely to normal direction of rotation of the valve and between each pair of main and supplementary ports a neutral channel capable of registry with casing passages and communicating with said outlet, and said valve having a passage capable of affording communication periodically between said inlet and controller-ports and having another passage capable of affording communication periodically between controller-ports and said outlet.

7. A valve mechanism comprising a member comprehending a chamber and having high-pressure and lower-pressure passages and a fluid-supply inlet and a fluid-exhaust outlet opening to the chamber, and in said chamber a rotary valve having a passage capable of affording communication periodically between said inlet and a high-pressure passage and having another passage capable of affording communication periodically between a high-pressure passage and a lower-pressure passage and having still another passage capable of affording communication periodically between a lower-pressure passage and said outlet.

8. A valve mechanism comprising a member comprehending a chamber and having high-pressure and lower-pressure passages opening to the chamber and a fluid-supply inlet at one end and a fluid-exhaust outlet at the other end, and in said chamber a rotary valve having a passage capable of affording communication periodically between said inlet and a high-pressure passage and having another passage capable of affording communication periodically between a high-pressure passage and a lower-pressure passage and having still another passage capable of affording communication periodically between a lower-pressure passage and said outlet.

9. A valve mechanism comprising a member comprehending a chamber and having high-pressure and lower-pressure passages having enlarged inner ends opening to the chamber and a fluid-supply inlet and a fluid-exhaust outlet, and in said chamber a rotary valve having a passage capable of affording communication periodically between said inlet and a high-pressure passage and having another passage capable of affording communication periodically between a high-pressure passage and a lower-pressure passage and having still another passage capable of affording communication periodically between a lower-pressure passage and said outlet.

10. A valve mechanism comprising a casing comprehending a chamber and having high-pressure and lower-pressure passages and a fluid-supply inlet and a fluid-exhaust outlet opening to the chamber, in said chamber a rockable controller having ports normally in registry with casing-passages, and in said controller a rotary valve having a passage capable of affording communication periodically between said inlet and a high-pressure passage through a controller-port and having another passage capable of affording communication periodically through controller-ports between a high-pressure passage and a lower pressure passage and having still another passage capable of affording communication periodically between a lower-pressure passage through a controller-port and said outlet.

11. A valve mechanism comprising a casing comprehending a chamber and having high-pressure and lower-pressure passages and a fluid-supply inlet and a fluid-exhaust outlet opening to the chamber, in said chamber a rockable annular controller, and in said controller a rotary valve, said controller having main ports normally in registry with said casing-passages and for each main port a supplementary port capable of registry with a casing-passage and having at its inner end an offsetted opening extending oppositely to the normal direction of rotation of said valve, and said valve having a passage capable of affording communication periodically between said inlet and a high-pressure passage through a controller-port and having another passage capable of affording communication periodically through controller-ports between a high-pressure passage and a lower-pressure passage and having still another passage capable of affording communication periodically between a lower-pressure passage through a controller-port and said outlet.

12. A valve mechanism comprising a casing comprehending a chamber and having high-pressure and lower-pressure passages and a fluid-supply inlet and a fluid-exhaust outlet opening to the chamber, in said chamber a rockable controller having ports normally in register with casing-passages and having a neutral channel capable of registry with a casing-passage and communicating with said outlet, and in said controller a rotary valve having a passage capable of affording communication periodically between said inlet and a high-pressure passage through a controller-port and having another passage capable of affording communication periodically through controller-ports between a high-pressure passage and a lower-pressure passage and having still another passage capable of affording communication periodically between a lower-pressure passage through a controller-port and said outlet.

13. A valve mechanism comprising a casing comprehending a chamber and having high-pressure and lower-pressure passages and a fluid-supply inlet and a fluid-exhaust outlet opening to the chamber, in said chamber a rockable annular controller, and in said controller a rotary valve, said controller having main ports normally in registry with casing-passages and for each main port a supplementary port having at its inner end an offsetted opening extending oppositely to the normal direction of rotation of said valve and between each pair of main and supplementary ports a neutral channel capable of registry with a casing-passage and communicating with said outlet, and said valve having a passage capable of affording communication periodically between said inlet and a high-pressure passage through a controller-port and having another passage capable of affording communication periodically through controller-ports between a high-pressure passage and a lower-pressure passage and having still another passage capable of affording communication periodically between a lower-pressure passage through a controller-port and said outlet.

14. A valve mechanism comprising an interiorly-annular casing comprehending a chamber and having high-pressure and lower-pressure passages opening to the chamber and a fluid-supply inlet at one end and a fluid-exhaust outlet at the other end, and in said chamber a rotary valve separating said inlet and outlet, said valve having a passage constantly in communication with said inlet and capable of affording communication periodically therefrom to any one of said high-pressure passages, another passage capable of affording communication periodically between any one of said high-pressure passages and one of said lower-pressure passages, and an exhaust-passage constantly in communication with said outlet and capable of affording communication periodically thereto from any one of said lower-pressure passages.

15. A valve mechanism comprising an interiorly-annular casing comprehending a chamber and having high-pressure and lower-pressure passages opening to the chamber and a fluid-supply inlet at one end and a fluid-exhaust outlet at the other end, in said chamber a rockable controller to the interior of which said inlet and outlet open and having ports normally in registry with casing-passages, and in said chamber a rotary valve separating said inlet and outlet, said valve having a passage constantly in communication with said inlet and capable of affording communication periodically therefrom through a controller-port to any one of said high-pressure passages, another passage capable of affording communication periodically through controller-ports between any one of said high-pressure passages and a lower-pressure passage, and an exhaust-passage constantly in communication with said outlet and capable of affording communication periodically thereto through a controller port from a lower-pressure passage.

16. A valve mechanism comprising a member comprehending a chamber and having passages and a fluid-supply inlet and a fluid-exhaust outlet opening to the chamber, in said chamber a rockable controller, and in said controller a rotary valve separating said inlet and outlet, said controller having main ports normally in registry with said casing-passages and for one of the main ports a supplementary port capable of registry with casing-passages, and said valve having passages capable of simultaneous registry with controller-ports and one of them of affording communication periodically between said inlet and a port and another of them of affording communication periodically between a port and said outlet.

17. A valve mechanism comprising a member comprehending a valve-chamber and having opening to said chamber passages arranged in different circumferential lines and a fluid-supply inlet at one end and a fluid-exhaust outlet at the other end, and in said chamber a rotary valve separating said inlet and outlet and arranged to afford communication at different times between said inlet and any one of said casing-passages and between one of said casing passages and said outlet.

In testimony whereof I affix my signature in presence of two witnesses.

FORREST C. SHELTON.

Witnesses:
J. ADDISON HICKS,
ROYAL E. BURNHAM.

Copies of this patent may be obtained for five cents each, by addressing the "Commissioner of Patents, Washington, D. C."